(12) United States Patent
Danno et al.

(10) Patent No.: US 11,296,326 B2
(45) Date of Patent: Apr. 5, 2022

(54) ENERGY STORAGE DEVICE AND METHOD FOR MANUFACTURING THE SAME

(71) Applicant: GS Yuasa International Ltd., Kyoto (JP)

(72) Inventors: Hiroyuki Danno, Kyoto (JP); Taku Nakamura, Kyoto (JP); Keita Hamakawa, Ritto (JP); Hisayuki Yamane, Ritto (JP); Kenichiro Ueki, Ritto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 770 days.

(21) Appl. No.: 16/076,043

(22) PCT Filed: Feb. 8, 2017

(86) PCT No.: PCT/JP2017/004646
§ 371 (c)(1),
(2) Date: Aug. 7, 2018

(87) PCT Pub. No.: WO2017/138584
PCT Pub. Date: Aug. 17, 2017

(65) Prior Publication Data
US 2021/0194007 A1 Jun. 24, 2021

(30) Foreign Application Priority Data
Feb. 10, 2016 (JP) .............................. JP2016-024175

(51) Int. Cl.
*H01M 4/62* (2006.01)
*H01G 11/26* (2013.01)
(Continued)

(52) U.S. Cl.
CPC ............ *H01M 4/628* (2013.01); *H01G 11/26* (2013.01); *H01M 4/04* (2013.01); *H01M 10/058* (2013.01); *H01M 10/0587* (2013.01)

(58) Field of Classification Search
None
See application file for complete search history.

(56) References Cited

U.S. PATENT DOCUMENTS

| 2006/0051678 A1 | 3/2006 | Kim et al. |
| 2010/0055565 A1 | 3/2010 | Naoi et al. |

(Continued)

FOREIGN PATENT DOCUMENTS

| JP | 2006-040878 A | 2/2006 |
| JP | 2010-097832 A | 4/2010 |

(Continued)

OTHER PUBLICATIONS

International Search Report (ISR) (PCT Form PCT/ISA/216), in PCT/JP2017/004646, dated Apr. 11, 2017.

*Primary Examiner* — Daniel S Gatewood
(74) *Attorney, Agent, or Firm* — McGinn I.P. Law Group, PLLC.

(57) ABSTRACT

An energy storage device (10) includes: an electrode assembly (400) which includes a positive electrode plate (410) and a negative electrode plate (420), wherein the positive electrode plate (410) includes: a positive electrode substrate (411) which is electrically conductive; a positive electrode composite layer (414) which is formed on the positive electrode substrate (411), and an insulating layer (415), at least a part of the insulating layer being continuously formed on the positive electrode substrate (411) and an edge portion (414*a*) which is a portion including an edge of the positive electrode composite layer (414), and wherein an uneven portion (415*a*) is formed in the insulating layer (415) above (Continued)

the edge portion (414a) of the positive electrode composite layer (414).

19 Claims, 5 Drawing Sheets (51) Int. Cl.
*H01M 4/04* (2006.01)
*H01M 10/0587* (2010.01)
*H01M 10/058* (2010.01)

(56) References Cited

U.S. PATENT DOCUMENTS

| | | | |
|---|---|---|---|
| 2011/0091754 A1 | 4/2011 | Miyahisa et al. | |
| 2015/0125732 A1* | 5/2015 | Ohta | H01M 10/0525 |
| | | | 429/130 |
| 2016/0248065 A1* | 8/2016 | Miyazaki | H01M 4/622 |

FOREIGN PATENT DOCUMENTS

| | | | |
|---|---|---|---|
| JP | 4529436 B2 | 8/2010 | |
| JP | 4672079 B2 | 4/2011 | |
| JP | 5365106 B2 | 12/2013 | |
| WO | WO 2013/176161 A1 | 11/2013 | |

* cited by examiner

ENERGY STORAGE DEVICE AND METHOD FOR MANUFACTURING THE SAME

TECHNICAL FIELD

The present invention relates to an energy storage device including an electrode assembly having a positive electrode plate and a negative electrode plate, and a method for manufacturing the energy storage element.

BACKGROUND ART

Conventionally, an energy storage device such as a lithium ion secondary battery has an electrode assembly in which a positive electrode plate, a negative electrode plate, and a separator disposed between the positive electrode plate and the negative electrode plate are layered. Conventionally, a technique relating to preventing a short circuit between a positive electrode plate and a negative electrode plate has been disclosed with respect to such an electrode assembly having a structure in which a positive electrode plate, a negative electrode plate, and a separator are layered.

For example, Patent Document 1 discloses a lithium ion secondary battery including an insulating layer formed so as to cover at least one of protrusions formed at both end portions of at least one electrode active material layer in a positive electrode plate and a negative electrode plate. In the lithium ion secondary battery, the insulating layer includes a through hole having a predetermined shape. With this configuration, the positive active material layer can participate in a reaction also in the region where the insulating layer is formed.

PRIOR ART DOCUMENTS

Patent Documents

Patent Document 1: JP-A-2006-40878

SUMMARY OF THE INVENTION

Problems to be Solved by the Invention

For example, in the case where an insulating layer is formed on an end portion (active material uncoated portion) of a positive electrode plate where a composite layer is not formed, it is important that no gap be formed between the insulating layer and the composite layer from the viewpoint of preventing short circuit between the positive electrode plate and the negative electrode plate. Therefore, it is desired to form the insulating layer with high accuracy along the edge of the composite layer, but it is difficult in reality to form the insulating layer and the edge of the composite layer side by side without gaps in the entire region in the longitudinal direction of the positive electrode plate.

In view of the above conventional problems, it is an object of the present invention to provide an energy storage device including an electrode assembly having a positive electrode plate and a negative electrode plate, which has high quality and a method for manufacturing the energy storage device.

Means for Solving the Problems

To achieve the above object, an energy storage device according to an aspect of the present invention includes: an electrode assembly which includes a positive electrode plate and a negative electrode plate, wherein the positive electrode plate or the negative electrode plate includes: a substrate which is electrically conductive; a composite layer which is formed on the substrate, and an insulating layer, at least a part of the insulating layer being continuously formed on the substrate and an edge portion which is a portion including an edge of the composite layer, and wherein an uneven portion is formed in the insulating layer above the edge portion of the composite layer.

Advantages of the Invention

According to the present invention, it is possible to provide an energy storage device including an electrode assembly having a positive electrode plate and a negative electrode plate and having high quality.

MODE FOR CARRYING OUT THE INVENTION

The inventors of the present invention studied to eliminate the gap between the insulating layer and the composite layer by forming the insulating layer so as to overlap the edge of the composite layer. However, in this case, for example, due to low transparency of the insulating layer, it may be difficult to check the position of the edge of the composite layer. Whether or not the composite layer is formed in the designed position and range in the electrode plate of the electrode assembly greatly affects the performance of the electrode assembly. Therefore, it is important from the viewpoint of quality control of, for example, an electrode assembly (energy storage device having an electrode assembly) to check the position of the edge of the composite layer after undergoing processes such as formation of an insulating layer.

In view of the above conventional problems, it is an object of the present invention to provide an energy storage device including an electrode assembly having a positive electrode plate and a negative electrode plate, which has high quality and a method for manufacturing the energy storage device.

To achieve the above object, an energy storage device according to an aspect of the present invention includes: an electrode assembly which includes a positive electrode plate and a negative electrode plate, wherein the positive electrode plate or the negative electrode plate includes: a substrate which is electrically conductive; a composite layer which is formed on the substrate, and an insulating layer, at least a part of the insulating layer being continuously formed on the substrate and an edge portion which is a portion including an edge of the composite layer, and wherein an uneven portion is formed in the insulating layer above the edge portion of the composite layer.

According to this configuration, in the electrode plate (positive electrode plate or negative electrode plate, the same shall apply hereafter), a part of the insulating layer formed on the substrate is arranged so as to cover the edge portion of the composite layer. That is, a part of the insulating layer overlaps the edge of the composite layer. Therefore, it is possible to form the insulating layer without forming a gap between the insulating layer and the composite layer by a relatively easy process. This further ensures prevention of short circuit between the positive electrode plate and the negative electrode plate.

Further, an uneven portion is formed in a portion of the insulating layer overlapping the edge portion of the composite layer. Therefore, for example, when light is irradiated to the insulating layer from a direction intersecting the thickness direction of the insulating layer, shade caused by the uneven portions are generated in the overlapping portion. As a result, even when the insulating layer is formed of a material with low transparency, it is easy to confirm the edge of the insulating layer. For example, in order to prevent shrinkage or peeling of the insulating layer, even when the transparency of the insulating layer is lowered by reducing the ratio of the binder in the material of the insulating layer, it is possible to confirm the position of the edge of the insulating layer.

As described above, the energy storage device according to the present aspect is an energy storage device including an electrode assembly having a positive electrode plate and a negative electrode plate, and is a high-quality energy storage device.

In the energy storage device according to an aspect of the present invention, the uneven portion of the insulating layer may be formed by an uneven shape of the composite layer at the edge portion.

According to this configuration, for example, by applying a material containing a resin to the edge portion of the composite layer, the uneven portion of the insulating layer is formed. Therefore, the degree of coincidence between the position of the uneven portion and the position of the edge portion is high. In addition, since the insulating layer is formed by the material constituting the insulating layer entering the irregularities at the edge portion of the composite layer and curing, the effect of suppressing peeling between the insulating layer and the edge portion of the composite layer is also exerted.

In the energy storage device according to an aspect of the present invention, the composite layer may include a plurality of active material particles and a binder, wherein the insulating layer may include a plurality of particles and a binder, and wherein an average particle diameter of the plurality of particles may be smaller than an average particle diameter of the plurality of active material particles.

According to this configuration, since the diameter of the active material particles contained in the composite layer is relatively large, only by undergoing the step of forming a composite layer on the substrate, relatively large irregularities are formed on the surface of the composite layer. As a result, the height of a bump or the depth of a dip in the uneven portion formed above the composite layer is such a magnitude as to produce visible shades, for example.

In the energy storage device according to an aspect of the present invention, a ratio of the particle and the binder which are included in the insulating layer may be between 80:20 and 95:5.

According to this configuration, for example, the possibility of occurrence of troubles such as peeling off of the insulating layer is reduced.

A method for manufacturing the energy storage device according to any one of the above-described aspects includes: a light irradiation step in which a light is irradiated on the insulating layer in a direction which intersects a thickness direction of the insulating layer; and an identification step in which a position of the edge portion of the composite layer is identified by using a position of a shadow generated at the uneven portion by the light which is irradiated in the light irradiation step.

According to this method, by irradiating light to the insulating layer in parallel or obliquely, the position of the edge of the composite layer existing under the insulating layer can be identified. That is, with respect to the electrode plate in which the exposure of the substrate in the gap between the insulating layer and the composite layer is prevented by forming the insulating layer so that a part of the insulating layer overlaps the edge portion of the composite layer, it is possible to efficiently identify the position of the edge of the composite layer covered with the insulating layer even when the insulating layer is opaque. Therefore, for example, in the production process of the electrode assembly, it can be confirmed whether or not the composite layer is accurately formed. That is, according to the method for manufacturing an energy storage device according to this aspect, it is possible to provide an energy storage device with high quality.

Hereinafter, an energy storage device according to an embodiment of the present invention will be described with reference to the drawings. It is to be noted that each drawing is a schematic view, not necessarily strictly illustrated.

In addition, the embodiments described below show one specific example of the present invention. The shapes, materials, constituent elements, arrangement positions and connection modes of constituent elements, order of production steps, and the like shown in the following embodiments are mere examples and are not intended to limit the present invention. In addition, among constituent elements in the following embodiments, constituent elements not described in the independent claims showing the most generic concept are described as arbitrary constituent elements.

First, with reference to FIG. 1 and FIG. 2, a general description will be given of the energy storage device 10 according to the embodiment.

Figure 1:
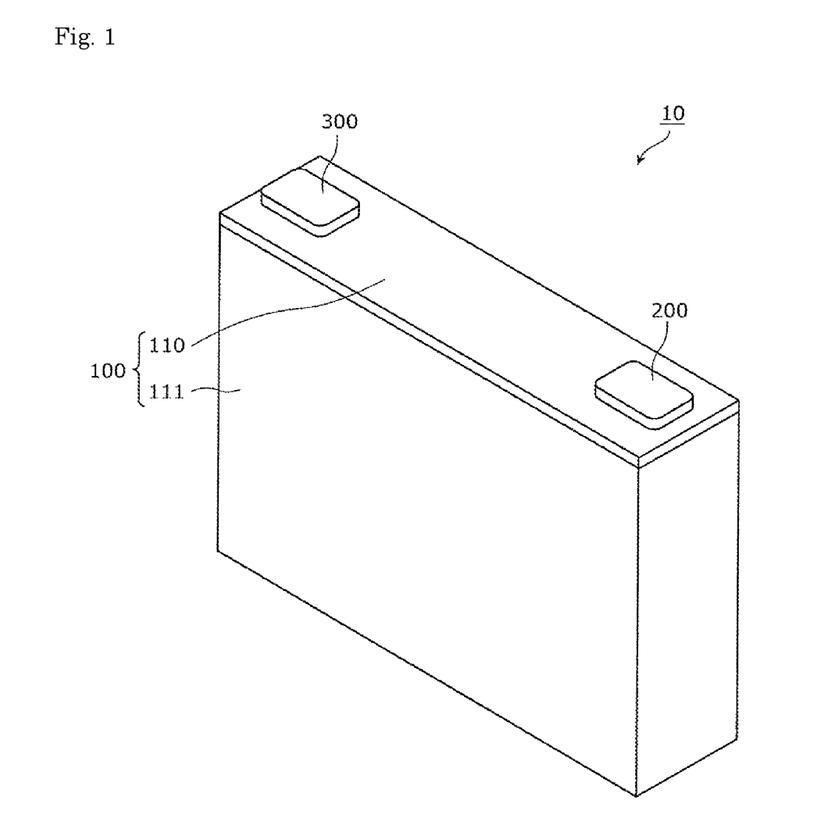
FIG. 1 is a perspective view showing an appearance of an energy storage device according to an embodiment.
Figure 2:
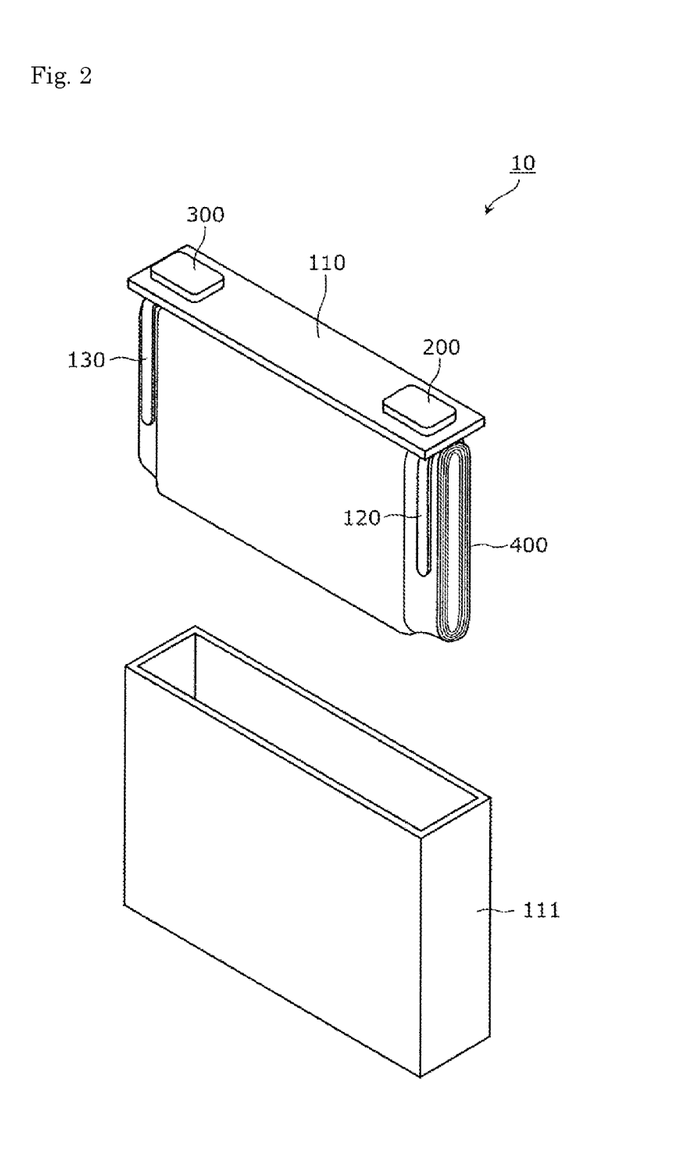
FIG. 2 is a perspective view showing constituent elements arranged in a container of the energy storage device according to the embodiment.

FIG. 1 is a perspective view showing an appearance of the energy storage device 10 according to the embodiment. FIG. 2 is a perspective view showing constituent elements arranged in a container of the energy storage device 10 according to the embodiment. Specifically, FIG. 2 is a perspective view separately showing the lid 110 and the main body 111 of the container 100 of the energy storage device 10.

The energy storage device 10 is a secondary battery that can charge electricity and discharge electricity, and more specifically, is a nonaqueous electrolyte secondary battery such as a lithium ion secondary battery. For example, the energy storage device 10 is applied to an electric vehicle (EV), a hybrid electric vehicle (HEV), or a plug-in hybrid electric vehicle (PHEV). In addition, the energy storage device 10 is not limited to the nonaqueous electrolyte secondary battery, and may be a secondary battery other than the nonaqueous electrolyte secondary battery, or may be a capacitor. The energy storage device 10 may be a primary battery that can use stored electricity even if the user does not charge it. Regarding the shape of the energy storage device 10, it is not limited to a rectangular shape, and other shapes such as a cylindrical shape may be used.

As shown in FIG. 1, the energy storage device 10 includes a container 100, a positive electrode terminal 200, and a negative electrode terminal 300. Further, as shown in FIG. 2, a positive current collector 120, a negative current collector 130, and an electrode assembly 400 are housed in the container 100.

In addition to the above-mentioned constituent elements, the energy storage device 10 may further include a spacer disposed on the side of the positive current collector 120 and the negative current collector 130, a gas release valve for releasing pressure when the pressure in the container 100 rises, or an insulating film enclosing the electrode assembly 400 and the like. Liquid such as an electrolyte solution (nonaqueous electrolyte) is enclosed in the container 100 of the energy storage device 10, but illustration of the liquid is omitted. The type of the electrolyte solution encapsulated in the container 100 is not particularly limited as long as it does not impair the performance of the energy storage device 10, and various electrolytic solutions can be selected.

The container 100 is composed of a main body 111 having a rectangular tubular shape and having a bottom, and a lid 110 of a plate-like member which closes the opening of the main body 111. In addition, the container 100 has a structure in which the inside of the container body 100 is sealed by welding or the like between the lid 110 and the main body 111 after housing the electrode assembly 400 or the like therein. The material of the lid 110 and the main body 111 is not particularly limited, but it is preferably a weldable metal such as stainless steel, aluminum, aluminum alloy or the like.

The electrode assembly 400 includes a positive electrode plate, a negative electrode plate, and a separator, and is a member capable of storing electricity. The detailed configuration of the electrode assembly 400 will be described later with reference to FIG. 3 and the like.

The positive electrode terminal 200 is an electrode terminal electrically connected to the positive electrode of the electrode assembly 400 via the positive current collector 120. The negative electrode terminal 300 is an electrode terminal electrically connected to the negative electrode of the electrode assembly 400 via the negative current collector 130. In other words, the positive electrode terminal 200 and the negative electrode terminal 300 are metal electrode terminals for leading out the electricity stored in the electrode assembly 400 to the external space of the energy storage device 10, and for introducing the electricity in the internal space of the energy storage device 10 in order to store the electricity in the electrode assembly 400. Further, the positive electrode terminal 200 and the negative electrode terminal 300 are attached to a lid 110 disposed above the electrode assembly 400 with a gasket (not shown) having an insulating property interposed therebetween.

The positive current collector 120 is a member having conductivity and rigidity which is disposed between the positive electrode of the electrode assembly 400 and the wall surface of the main body 111 of the container 100, and electrically connected to the positive electrode terminal 200 and the positive electrode of the electrode assembly 400.

The negative current collector 130 is a member having conductivity and rigidity which is disposed between the negative electrode of the electrode assembly 400 and the wall surface of the main body 111 of the container 100, and electrically connected to the negative electrode terminal 300 and the negative electrode of the electrode assembly 400.

Specifically, the positive current collector 120 and the negative current collector 130 are fixed to the lid 110. Further, the positive current collector 120 is joined to the positive electrode side end portion of the electrode assembly 400, and the negative current collector 130 is joined to the negative electrode side end portion of the electrode assembly 400. In the container 100, the electrode assembly 400 is held in a state suspended from the lid 110 by the positive current collector 120 and the negative current collector 130.

Next, the configuration of the electrode assembly 400 included in the energy storage device 10 configured as described above will be described with reference to FIG. 3.

Figure 3:
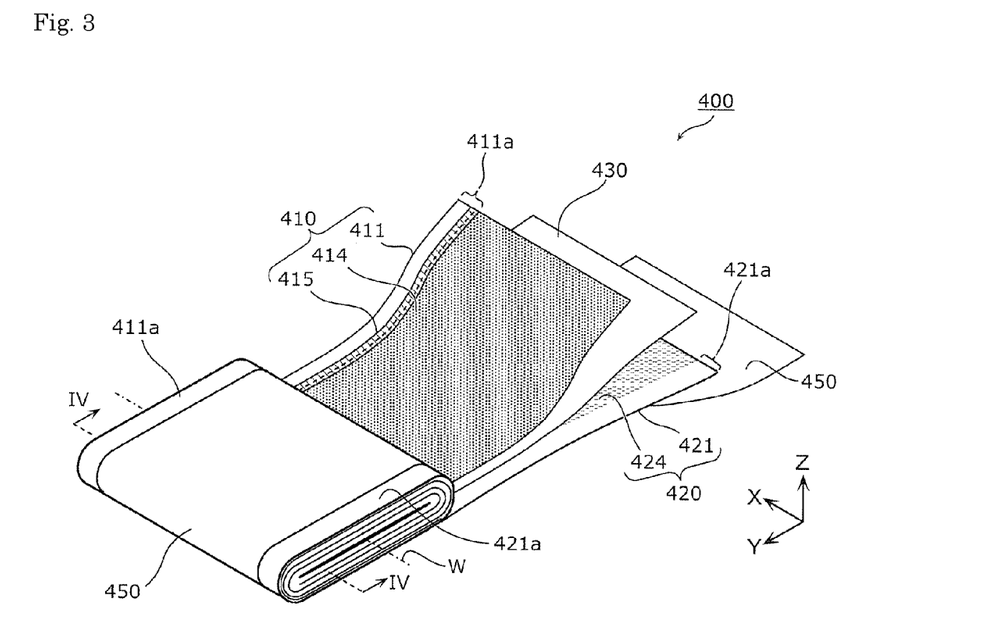
FIG. 3 is a perspective view showing a schematic configuration of an electrode assembly according to the embodiment.

FIG. 3 is a perspective view showing a schematic configuration of the electrode assembly 400 according to the embodiment. In FIG. 3, elements such as layered and wound electrode plates are partially developed and shown. In addition, the dashed line denoted by reference symbol W in FIG. 3 represents the winding axis of the electrode assembly 400. The winding axis W is an imaginary axis serving as a central axis when winding an electrode plate or the like, and in the present embodiment, it is a straight line parallel to an X axis passing through the center of the electrode assembly 400.

The electrode assembly 400 is an example of an electrode assembly having a positive electrode plate 410 and a negative electrode plate 420. In the present embodiment, as shown in FIG. 3, the electrode assembly 400 is formed by layering a separator 450, a negative electrode plate 420, a separator 430, and a positive electrode plate 410 in this order, and by winding them. Further, as shown in FIG. 3, the electrode assembly 400 has a flat shape in a direction orthogonal to the winding axis W (Z axis direction in the present embodiment). That is, when viewed from the direction of the winding axis W, the electrode assembly 400 has an elliptical shape as a whole, a straight line part of the elliptical shape has a flat shape, and a curved part of the elliptical shape has a curved shape. Therefore, the electrode assembly 400 has a pair of opposite flat portions (portions opposite to each other across the winding axis W in the Z-axis direction) and a pair of opposite curved portions (portions opposite to each other across the winding axis W in the Y-axis direction).

In the present embodiment, the positive electrode plate 410 is one in which a positive composite layer 414 containing a positive active material is formed on the surface of a long strip-like metal foil (positive substrate 411) made of aluminum. The negative electrode plate 420 is one in which a negative composite layer 424 containing a negative active material is formed on the surface of a long strip-like metal foil (negative substrate 421) made of copper. Examples of the positive active material and the negative active material will be described later.

Further, in the present embodiment, the separators 430 and 450 have a microporous sheet made of a resin as a substrate (base material).

More specifically, the positive electrode plate 410 and the negative electrode plate 420 are wound with being shifted from each other in the direction of the winding axis W with the separator 430 or 450 interposed between the positive electrode plate 410 and the negative electrode plate 420 in the electrode assembly 400 configured as described above. The positive electrode plate 410 and the negative electrode plate 420 each have an active material uncoated portion which is a portion of the substrate to which the active material is not applied at each end in the shifted direction.

Specifically, the positive electrode plate 410 has an active material uncoated portion 411a, which is not coated with the positive active material, at one end in the direction of the winding axis W (the end on the plus side in the X axis direction in FIG. 3). Further, the negative electrode plate 420 has an active material uncoated portion 421a, which is not coated with the negative active material, at the other end in the direction of the winding axis W (the end on the minus side in the X axis direct in FIG. 3).

That is, the positive electrode side end portion is formed by the layer of the exposed metal foil (active material uncoated portion 411a) of the positive electrode plate 410, and the negative electrode side end portion is formed by the layer of the exposed metal foil (active material uncoated portion 421a) of the negative electrode plate 420. The positive electrode side end portion is joined to the positive current collector 120 and the negative electrode side end portion is joined to the negative current collector 130. In the present embodiment, ultrasonic joining is adopted as a method of these joining. As a method of joining the electrode assembly 400 to the positive current collector 120 and the negative current collector 130, a technique such as resistance welding or clinching joining may be adopted in addition to the ultrasonic joining. In addition, the number of the electrode assemblies 400 included in the energy storage device 10 is not limited to one, and may be two or more.

In the electrode assembly 400 configured as described above, the insulating layer 415 is formed in a region including the boundary between the positive composite layer 414 and the active material uncoated portion 411a in the positive electrode plate 410. The insulating layer 415 contains a binder and particles such as inorganic particles. In other words, the positive electrode plate 410 has the insulating layer 415 disposed so as to straddle the positive substrate 411 and the positive composite layer 414, and thereby the reliability of preventing short circuit between the positive electrode plate 410 and the negative electrode plate 420 is improved. Hereinafter, the structure of the insulating layer 415 and its surroundings will be described with reference to FIGS. 4 to 6.

Figure 4:
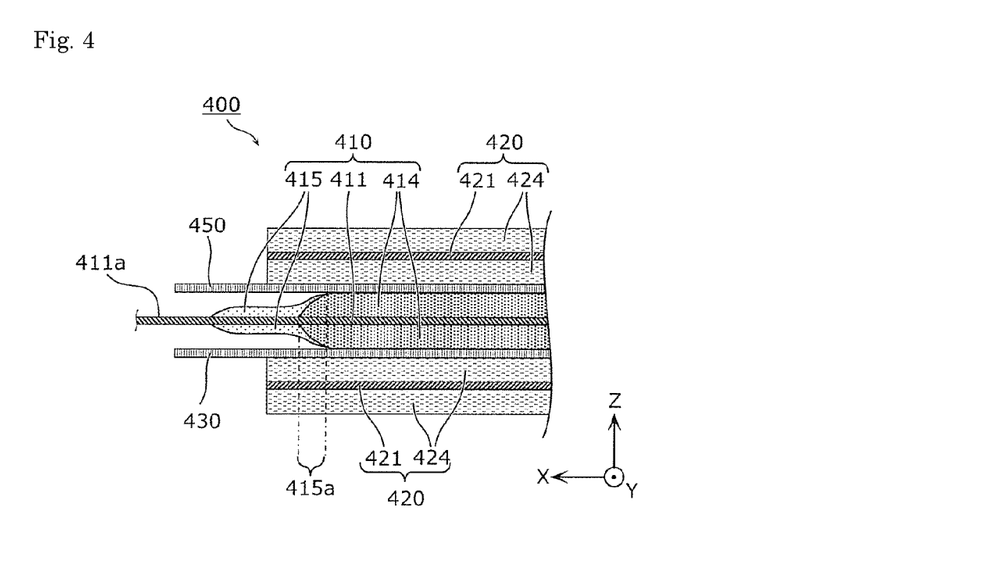
FIG. 4 is a cross-sectional view showing a schematic configuration of the electrode assembly according to the embodiment.
Figure 5:
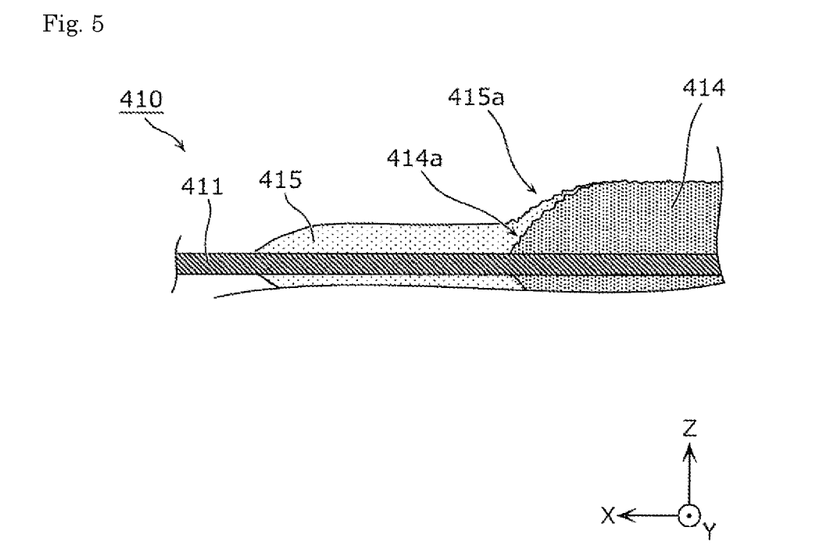
FIG. 5 is a view showing an example of a cross-section shape of a positive composite layer and an insulating layer according to the embodiment.
Figure 6:
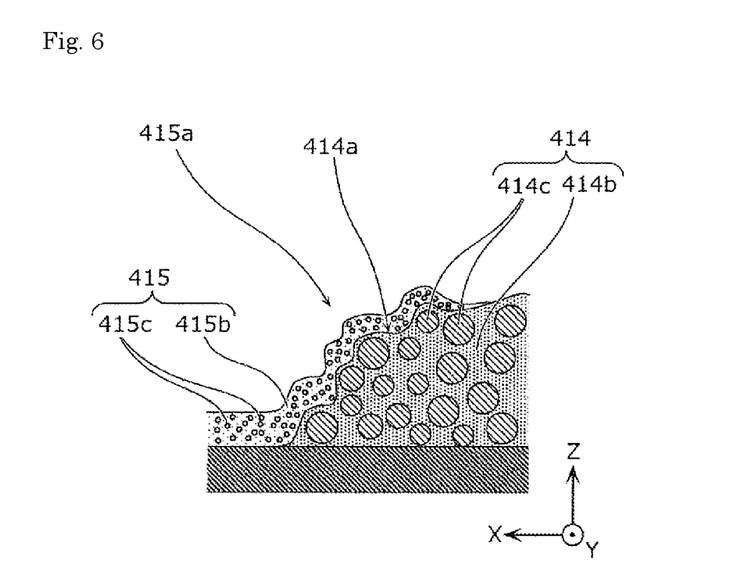
FIG. 6 is a view showing a configuration example of a positive composite layer and an insulating layer according to the embodiment.

FIG. 4 is a cross-sectional view schematically showing a configuration of the electrode assembly 400 according to the embodiment. Specifically, a part of the positive electrode side of the electrode assembly 400 in the IV-IV cross section of FIG. 3 is illustrated in FIG. 4. FIG. 5 is a view showing an example of the cross-section shape of the positive composite layer 414 and the insulating layer 415, and FIG. 6 is a view showing a configuration example of the positive composite layer 414 and the insulating layer 415.

As shown in FIGS. 4 and 5, the energy storage device 10 according to the present embodiment includes an electrode assembly 400 having a positive electrode plate 410 and a negative electrode plate 420. The positive electrode plate 410 includes a conductive positive substrate 411, a positive composite layer 414 formed on the positive substrate 411, and an insulating layer 415 continuously formed on the positive substrate 411 and the edge portion 414a, in which at least a part thereof includes a side edge of the positive composite layer 414.

As described above, in the present embodiment, an insulating layer 415 is formed so as to continuously cover a part of the portion (active material uncoated portion 411a) protruding from the positive composite layer 414 of the positive substrate 411 and the end portion 414a of the positive composite layer 414. As a result, as shown in FIG. 4, the possibility of electrical contact between the active material uncoated portion 411a and the negative electrode plate 420 having portions overlapping in the thickness direction (Z axis direction) is reduced. That is, a short circuit between the positive electrode plate 410 and the negative electrode plate 420 can be more reliably prevented.

In addition, since the insulating layer 415 is formed so that a part of the insulating layer 415 overlaps the edge of the positive composite layer 414, there is no need for a process requiring high accuracy such as adjoining each other without putting a gap between the insulating layer 415 and the positive composite layer 414.

Here, in the present embodiment, for example, as shown in FIG. 5, since the edge portion 414a of the positive composite layer 414 is covered with the insulating layer 415, it is difficult to confirm the position of the end edge (left end of the positive composite layer 414 in FIG. 5) included in the edge portion 414a.

Of course, it is possible to make the edge of the positive composite layer 414 covered with the insulating layer 415 visible by increasing the ratio of the binder (e.g., resin with high transparency) contained in the insulating layer 415. However, in this case, the insulation layer 415 contracts due to the high binder content ratio, and as a result, defects such as deformation of the positive electrode plate 410 or peeling of the insulating layer 415 are likely to occur.

Therefore, in order to suppress the possibility of occurrence of the above defects, it is preferred to decrease the ratio of the binder contained in the insulating layer 415. That is, it is preferred to increase the proportion of particles such as inorganic particles contained in the insulating layer 415. For example, when the content ratio of alumina or silica particles in the insulating layer 415 is large, the insulating layer 415 becomes whitish in general, and it is substantially difficult to check the position of the edge of the positive composite layer 414 from the outside of the insulating layer 415.

However, in the present embodiment, for example, as shown in FIG. 5, an uneven portion 415a is formed above the edge portion 414a of the positive composite layer 414 in the insulating layer 415. The uneven portion 415a is a portion formed by a plurality of dips or bumps arranged side by side, and shades by the plurality of bumps and dips appear by being obliquely or laterally irradiated with light. Therefore, the position of the edge of the positive composite layer 414 covered with the insulating layer 415 can be checked using the shade generated by the uneven portion 415a. Accordingly, it is possible to obtain the electrode assembly 400 having the insulating layer 415 in which a defect such as deformation or peeling hardly occurs, and having the positive composite layer 414 formed as intended design. The method of checking the position of the edge of the positive composite layer 414 will be described later with reference to FIG. 7.

In addition, the uneven portion 415a of the insulating layer 415 has a shape that makes it easy for foreign matter such as minute metal pieces to be caught, for example. Therefore, the insulating layer 415 can also function as a member for suppressing the movement of foreign matter toward the inside of the electrode assembly 400.

Further, since the surface area of the insulating layer 415 is increased by having the uneven portion 415a, the electrolyte solution is easy to penetrate. Thus, for example, a decrease in the penetration amount of the electrolyte solution into the electrode assembly 400 due to the existence of the insulating layer 415 is suppressed.

Further, in the present embodiment, the uneven portion 415a of the insulating layer 415 is formed along an uneven shape of the edge portion 414a of the positive composite layer 414. That is, as shown in FIG. 5, the surface of the edge portion 414a of the positive composite layer 414 has an uneven shape, and a material including a binder is applied or pasted thereon so that an insulating layer 415 having an uneven portion 415a along the uneven shape at surface of the edge portion 414a is formed.

Therefore, the positional accuracy with respect to the end edge portion 414a of the uneven portion 415a is high. For example, the coincidence degree in the X axis direction between the left end position of the uneven portion 415a in FIG. 5 and the position of the end edge (left end of the edge portion 414a) of the positive composite layer 414 is high. Therefore, the position of the edge of the positive composite layer 414 can be accurately checked. In addition, since the insulating layer 415 is fixed to the edge portion 414a in a state where the material of the insulating layer 415 penetrates into the irregularities of the edge portion 414a of the positive composite layer 414, for example, the effect of suppressing peeling of the insulating layer 415 is also exerted.

Here, each of the positive composite layer 414 and the insulating layer 415 according to the present embodiment contains a binder and particles. Specifically, as schematically shown in FIG. 6, the positive composite layer 414 contains a plurality of active material particles 414c and a binder 414b, and the insulating layer 415 contains a plurality of particles 415c and a binder 415b. The average particle size of the plurality of particles 415c is smaller than the average particle size of the plurality of active material particles 414c.

That is, since the diameter of the active material particles 414c is relatively large, for example, by merely undergoing a step of applying the material containing the plurality of active material particles 414c and the binder 414b on the positive substrate 411, a positive composite layer 414 having a plurality of irregularities on the surface is formed. In addition, since the diameter of the particles 415c contained in the insulating layer 415 is relatively small, in the case where the insulating layer 415 is formed on the end portion 414a of the positive composite layer 414, a shape of a portion of the insulating layer 415 located above the edge portion 414a of the positive composite layer 414 is dominated by the size of the diameter of the active material particles 414c of the positive composite layer 414. As a result, for example, the height of the bump or the depth of the dip in the uneven portion 415a has such a magnitude that causes visually recognizable shades.

The average particle size of the active material particles 414c contained in the positive composite layer 414 is, for example, about a dozen micrometers (μm), and the average particle diameter of the particles 415c contained in the insulating layer 415 is, for example, 1 μm or less. That is, in short, the active material particles 414c contained in the positive composite layer 414 is ten times or more larger than the particles 415c contained in the insulating layer 415.

Specific examples of types and sizes of the particles 415c and the binder 415b contained in the insulating layer 415 are as follows. As the particles 415c contained in the insulating layer 415, $Al_2O_3$ having an average particle size (median diameter (D50)) of 0.7±0.16 μm and a specific surface area of 4.5±0.5 $m^2/g$ is exemplified. As the binder 415b, polyvinylidene fluoride (PVDF) having a number average molecular weight of about 500000 is exemplified.

Here, the weight ratio between the particles 415c and the binder 415b contained in the insulating layer 415 is preferably within a predetermined range. Specifically, when the proportion of the binder 415b is more than 20%, for example, the insulating layer 415 is turned up and easily peels off. When the proportion of the binder 415b is smaller than 5%, for example, the insulating layer 415 tends to be scattered. Therefore, the ratio of the particles 415c and the binder 415b contained in the insulating layer 415 is preferably any of from 80:20 to 95:5. In the present embodiment, the weight ratio between the particles 415c and the binder 415b contained in the insulating layer 415 is about 90:10.

The positive active material contained as active material particles 414c in the positive composite layer 414 can be selected from composite oxides ($Li_xCoO_2$, $Li_xNiO_2$, $Li_xMn_2O_4$, $Li_xMnO_3$, $Li_xNi_yCo_{(1-y)}O_2$, $Li_xNi_yMn_zCo_{(1-y-z)}O_2$, $Li_xNi_yMn_{(2-y)}O_4$, and the like) represented by $Li_xMO_y$ (M represents at least one kind of transition metal), or polyanion compounds (LiFePO$_4$, LiMnPO$_4$, LiNiPO$_4$, LiCoPO$_4$, Li$_3$V$_2$(PO$_4$)$_3$, Li$_2$MnSiO$_4$, Li$_2$CoPO$_4$F, and the like) represented by $Li_wMe_x(XO_y)_z$ (Me represents at least one transition metal, and X represents, for example, P, Si, B, and V). In addition, elements or polyanions in these compounds may be partially substituted with other elements or anionic species, and the surface may be coated with a metal oxide such as $ZrO_2$, MgO, $Al_2O_3$ or carbon. In addition, examples of the positive active material include conductive polymer compounds such as disulfide, polypyrrole, polyaniline, polyparastyrene, polyacetylene, polyacene materials and the like, carbonaceous materials of pseudo graphite structure, and the like, but the material is not limited thereto. These compounds may be used singly or in combination of two or more kinds.

The particles 415c contained in the insulating layer 415 are, for example, inorganic particles. Examples of the inorganic particles include oxides such as alumina, silica, zirconia, titania, magnesia, ceria, yttria, zinc oxide, iron oxide, barium titanium oxide, and alumina-silica composite oxide; nitrides such as silicon nitride, titanium nitride, boron nitride and aluminum nitride; hardly soluble ion crystals such as calcium fluoride, barium fluoride and barium sulfate; covalent crystals such as silicon and diamond; silicon carbide, calcium carbonate, aluminum sulfate, aluminum hydroxide, potassium titanate, talc, kaolin clay, kaolinite, halloysite, pyrophyllite, montmorillonite, sericite, mica, amethite, bentonite, asbestos, zeolite, calcium silicate, magnesium silicate, boehmite, apatite, mullite, spinel, olivine and the like, compounds containing these, and the like. In addition, the above-mentioned inorganic material may be particles having electrical insulation properties by subjecting the surface of conductive particles such as oxides such as $SnO_2$ and tin-indium oxide (ITO), carbonaceous materials such as carbon black and graphite to a surface treatment with an electrically insulating inorganic material (for example, a material constituting the above-mentioned electrically insulating inorganic particles). In addition, the particles 415c contained in the insulating layer 415 may be organic particles.

The binder contained in the insulating layer 415 is an aqueous or nonaqueous binder, and the binder contained in the positive composite layer 414 is, for example, a binder having the same polarity as the binder contained in the insulating layer 415. For example, when the insulating layer 415 contains an aqueous binder, the positive composite layer 414 also contains an aqueous binder. In addition, when the insulating layer 415 contains a nonaqueous binder, the positive composite layer 414 also contains a nonaqueous binder.

Here, the aqueous binder is a binder which is dispersed or dissolved in water. As the aqueous binder, a water-soluble binder (aqueous binder soluble in water) which dissolves in an amount of 1 part by mass or more with respect to 100 parts by mass of water at 20° C. is preferred. Preferred one as the aqueous binder is at least one selected from the group consisting of polyethylene oxide (polyethylene glycol), polypropylene oxide (polypropylene glycol), polyvinyl alcohol, polyacrylic acid, polymethacrylic acid, polytetrafluoroethylene (PTFE), styrene butadiene rubber (SBR), polyolefin, nitrile-butadiene rubber, and cellulose, and more preferred one is at least one water-soluble binder selected from the group consisting of polyethylene oxide (polyethylene glycol), polypropylene oxide (polypropylene glycol), polyvinyl alcohol, polyacrylic acid, and polymethacrylic acid.

In addition, the nonaqueous binder is a binder (solvent type binder) having a lower water solubility than the aqueous binder. As the nonaqueous binder, a binder that dissolves in an amount of less than 1 part by mass with respect to 100 parts by mass of water at 20° C. is preferred. Examples of the nonaqueous binder include PVDF, a copolymer of vinylidene fluoride and hexafluoropropylene, a copolymer of ethylene and vinyl alcohol, polyacrylonitrile, polyphosphazene, polysiloxane, polyvinyl acetate, polymethacrylic acid methyl, polystyrene, polycarbonate, polyamide, polyimide, polyamideimide, a crosslinked polymer of cellulose and chitosan pyrrolidone carboxylate, derivatives of chitin or chitosan, and the like. Examples of derivatives of chitosan include polymer compounds obtained by glycerylating chitosan, crosslinked products of chitosan, and the like.

In addition, when the positive composite layer 414 contains a nonaqueous binder, as the nonaqueous binder, at least one selected from the group consisting of polyvinylidene fluoride, a copolymer of ethylene and vinyl alcohol and polymethyl methacrylate is preferred from the viewpoint of excellent binding property or low electric resistance.

In the present embodiment, the insulating layer 415 is provided on the positive electrode plate 410, but in addition to the positive electrode plate 410 or in place of the positive electrode plate 410; however, the insulating layer 415 may be provided on the negative electrode plate 420.

The negative electrode composite layer 424 formed on the negative substrate 421 in the negative electrode plate 420 contains active material particles and a binder. The negative active material contained in the negative composite layer 424 as an active material particle is, for example, lithium metal, lithium alloy (lithium metal-containing alloys such as lithium-aluminum, lithium-lead, lithium-tin, lithium-aluminum-tin, lithium-gallium, and wood alloys), alloys capable of absorbing and releasing lithium, carbon materials (e.g., graphite, non-graphitizable carbon, easily graphitizable carbon, low temperature calcined carbon, amorphous carbon, etc.), metal oxides, lithium metal oxides (such as $Li_4Ti_5O_{12}$), polyphosphoric acid compounds, and the like. Among them, graphite, non-graphitizable carbon and easily graphitizable carbon are particularly preferred. These may be used singly or in combination of two or more in any combination and ratio.

As the binder contained in the negative composite layer 424, the same binder as that used for the positive composite layer 414 can be adopted.

Next, a method for checking the position of the edge of the composite layer (the positive composite layer 414 in the present embodiment) in the production process of the electrode assembly 400 having the above configuration will be described with reference to FIG. 7.

Figure 7:
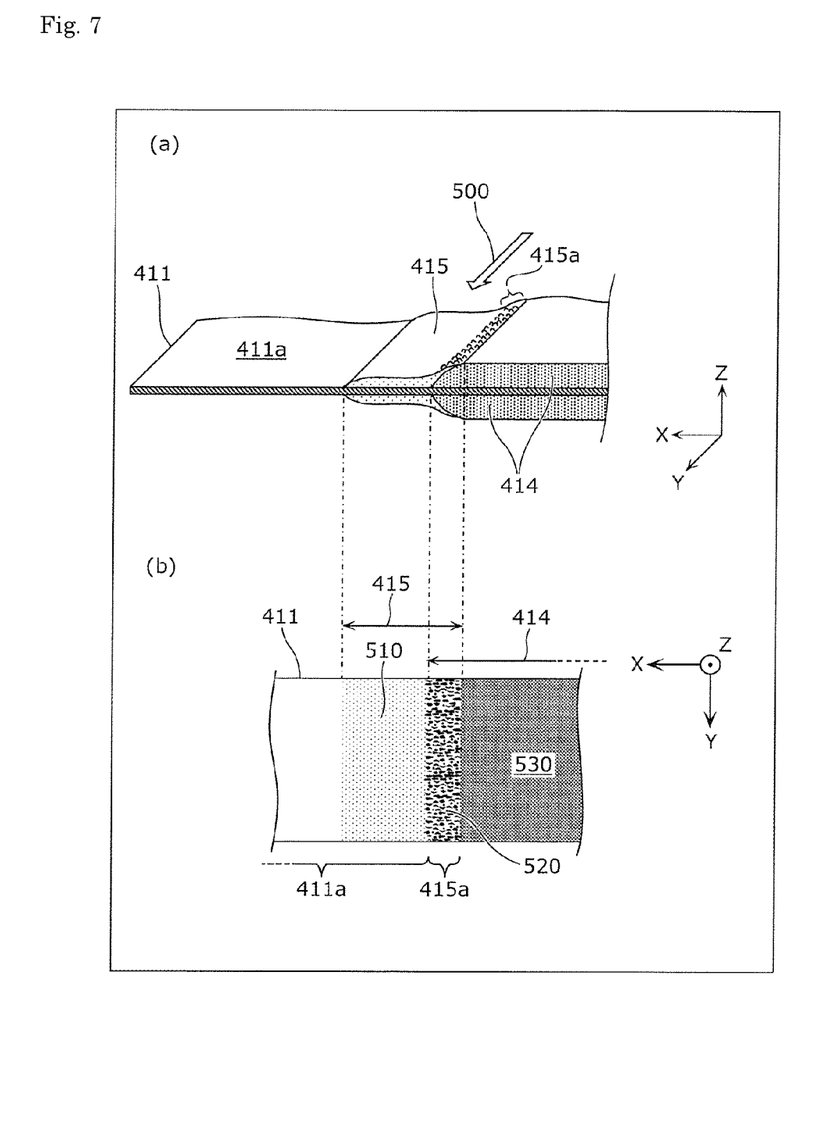
FIG. 7 is a view for explaining a part of a method for manufacturing an energy storage device according to the embodiment.

FIG. 7 is a view for explaining a part of a method for manufacturing an energy storage device 10 according to the embodiment. Specifically, FIG. 7 schematically shows a method for confirming the position of the edge of the positive composite layer 414 when producing the electrode assembly 400 provided in the energy storage device 10.

The method for manufacturing the energy storage device 10 according to the present embodiment includes a light irradiation step of irradiating light to the insulating layer 415 from a direction intersecting with the thickness direction of the insulating layer 415 and an identifying step of identifying the position of the edge of the positive composite layer 414 using the position of a shadow generated at the uneven portion 415a by the light irradiated in the light irradiation step.

For example, as shown in FIG. 7(a), light 500 is irradiated to the insulating layer 415 along the longitudinal direction (Y axis direction) of the positive electrode plate 410. As a result, as shown in FIG. 7(b), when the insulating layer 415 is viewed in a plan view, the insulating layer 415 is clearly distinguished and recognized between the shaded region 520 and the non-shaded region 510. The shaded region 520 is a region in which the shade caused by a plurality of dips or bumps in the uneven portion 415a is observed. In addition, the non-shaded region 510 is a region where almost no shade is generated because it is substantially flat.

Therefore, it is easy to identify the position of the boundary between the shaded region 520 and the non-shaded region 510 (for example, measuring the distance from the left end of the positive electrode substrate 411 to the position). Further, this position coincides (also includes substantially coinciding) with the position of the edge of the positive composite layer 414 covered with the insulating layer 415. Therefore, it is easy to identify the position of the edge of the positive composite layer 414 (measurement of the distance from the reference position, etc.).

Thereby, it is possible to form the insulating layer 415 with a part thereof overlapped with the positive composite layer 414, and it is easy to check whether or not the positive composite layer 414 is formed with high accuracy. Further, as the material of the insulating layer 415, a material having a relatively small binder content ratio (material having low transparency) can be selected, and thereby deformation of the positive electrode plate 410 or peeling of the insulating layer 415 and the like are suppressed. Therefore, according to the manufacturing method of the energy storage device 10 according to the present embodiment, the energy storage device 10 with high quality can be obtained.

The light irradiation step and the identifying step, for example, are performed before winding elements such as the positive electrode plate 410 and the like after forming the positive composite layer 414 and the insulating layer 415 on the positive substrate 411. In addition, the light irradiation step and the identifying step may be performed over the entire area of the positive electrode plate 410 in the longitudinal direction, or may be performed for every predetermined length.

Although it is not indispensable that the insulating layer 415 is whitish, in the case where the insulating layer 415 becomes whitish due to inclusion of particles such as silica, it is advantageous from the viewpoint of clarity of the shade generated in the uneven portion 415a.

In addition, the irradiation direction of the light 500 does not need to be parallel to the longitudinal direction (Y axis direction) of the positive electrode plate 410. However, considering that the irradiation of the light 500 is intended to identify the edge of the positive composite layer 414 on the active material uncoated portion 411a side, the irradiation direction of the light 500 is preferably a direction orthogonal to the X axis direction and intersecting the thickness direction (Z axis direction).

Shade is also generated in a region of the positive composite layer 414 where the insulating layer 415 does not overlap (the composite-exposed area 530 in FIG. 7(b)) due to irregularities on the surface. However, since the positive composite layer 414 has a dark color, the composite-exposed area 530 is dark as a whole and is visually recognized as a region with poor contrast. Therefore, by irradiating the insulating layer 415 with the light 500, the position of the edge of the positive composite layer 414 is identified, and the edge of the insulating layer 415 opposite to the active material uncoated portion 411a (a minus side of the X-axis direction) can also be identified. Thus, for example, it can be checked whether a width in a lateral direction (width in the X axis direction) of the insulating layer 415 is a value as designed or the like.

In addition, the identification of the position of the edge of the positive composite layer 414 (the above-mentioned identifying step) by irradiating the insulating layer 415 with the light 500 may be performed by a person visually recognizing, or may be performed automatically by using an optical device such as a camera.

Another Embodiment

The energy storage device and the manufacturing method thereof according to the present invention have been described above based on the embodiments. However, the present invention is not limited to the above embodiment. Without departing from the purport of the present invention, it is to be understood that various modifications envisioned by those skilled in the art may be applied to the above-described embodiments, or configurations constructed by combining a plurality of the above-described components are included within the scope of the present invention.

For example, in the above embodiment, as shown in FIG. 4 etc., the insulating layer 415 covers only the edge portion 414a of the positive composite layer 414 on the active material uncoated portion 411a side, but the insulating layer 415 may cover the entire region (including substantially the entire region) of the positive composite layer 414. This further improves the reliability of prevention of short circuit with the negative electrode plate 420 in the entire region of the positive composite layer 414.

That is, at least a part of the insulating layer 415 may be continuously formed on the positive (or negative) substrate and the edge portion which is the portion including the edge of the positive (or negative) composite layer.

A layer for improving adhesion between the positive substrate 411 and the positive composite layer 414 such as an undercoat layer may be provided on the surface of the positive substrate 411 to which the positive composite is applied. The negative electrode plate 420 may also be provided with a layer for improving adhesion between the negative substrate 421 and the negative composite layer 424 such as an undercoat layer on the surface of the negative substrate 421 to which the negative composite is applied in the same manner.

In the above embodiment, the positive composite layer 414 contains a binder having the same polarity as that of the insulating layer 415, but the positive composite layer 414 may contain a binder having a polarity different from that of the insulating layer 415.

In addition, the electrode assembly included in the energy storage device 10 does not need to be a wound type. The energy storage device 10 may be provided with, for example, a stacked electrode assembly in which flat plate-shaped electrode plates are stacked. Further, the energy storage device 10 may include, for example, an electrode assembly having a structure in which long strip-shaped electrode plates are stacked in a bellows shape by repeatedly performing mountain folding and valley folding. In either case, since the positive electrode plate and the negative electrode plate are layered with the separator interposed therebetween, the reliability of preventing short circuit between the positive electrode plate and the negative electrode plate is improved by inclusion of the insulating layer covering the active material uncoated portion and the edge portion of the composite layer by the positive electrode plate or the negative electrode plater. Further, since the uneven portion of the insulating layer is formed above the edge portion of the composite layer of the insulating layer, the position of the edge of the composite layer can be easily confirmed as described above.

Also, configurations constructed by arbitrarily combining the configurations described in the above embodiments are also included within the scope of the present invention.

Further, the present invention can be realized not only as the above-described energy storage device but also as an electrode assembly 400 included in the energy storage device. Further, the present invention can also be realized as an energy storage apparatus having a plurality of the energy storage devices.

INDUSTRIAL APPLICABILITY

The present invention can be applied to an energy storage device such as a lithium ion secondary battery.

DESCRIPTION OF REFERENCE SIGNS

10: Energy storage device
100: Container
110: Lid
111: Main body
120: Positive current collector
130: Negative current collector
200: Positive electrode terminal
300: Negative electrode terminal
400: Electrode assembly
410: Positive electrode plate
411: Positive substrate
411a, 421a: Active material uncoated portion
414: Positive composite layer
414a: Edge portion
414b, 415b: Binder
414c: Active material particles
415: Insulating layer
415a: Uneven portion
415c: Particle
420: Negative electrode plate
421: Negative substrate
424: Negative composite layer
430, 450: Separator
500: Light
510: Non-shaded area
520: Shaded area
530: Composite-exposed area

The invention claimed is:

1. An energy storage device comprising:
an electrode assembly which includes a positive electrode plate and a negative electrode plate,
wherein the positive electrode plate or the negative electrode plate includes:
a substrate which is electrically conductive;

a composite layer which is formed on the substrate, and
an insulating layer, at least a part of the insulating layer being continuously formed on the substrate and an edge portion which is a portion including an edge of the composite layer,
wherein an uneven portion is formed in the insulating layer above the edge portion of the composite layer,
wherein the uneven portion of the insulating layer is formed by an uneven shape of the composite layer at the edge portion,
wherein the uneven portion of the insulating layer is continuously formed along an uneven shape of the composite layer at the edge portion, and
wherein the uneven portion comprises at least one of a dip and a bump arranged side by side.

2. The energy storage device according to claim 1,
wherein the composite layer includes a plurality of active material particles and a binder,
wherein the insulating layer includes a plurality of particles and a binder, and
wherein an average particle diameter of the plurality of particles is smaller than an average particle diameter of the plurality of active material particles.

3. The energy storage device according to claim 2, wherein a ratio of the particle and the binder which are included in the insulating layer is between 80:20 and 95:5.

4. A method for manufacturing an energy storage device, said energy storage device comprising:
an electrode assembly which includes a positive electrode plate and a negative electrode plate,
wherein the positive electrode plate or the negative electrode plate includes:
a substrate which is electrically conductive;
a composite layer which is formed on the substrate, and
an insulating layer, at least a part of the insulating layer being continuously formed on the substrate and an edge portion which is a portion including an edge of the composite layer,
wherein an uneven portion is formed in the insulating layer above the edge portion of the composite layer;
the method comprising:
a light irradiation step in which a light is irradiated on the insulating layer in a direction which intersects a thickness direction of the insulating layer; and
an identification step in which a position of the edge portion of the composite layer is identified by using a position of a shadow generated at the uneven portion by the light which is irradiated in the light irradiation step.

5. The energy storage device according to claim 1, wherein a ratio of the particle and the binder which are included in the insulating layer is between 80:20 and 95:5.

6. The energy storage device according to claim 1
wherein the uneven shape comprises a plurality of irregularities in the composite layer at the edge portion.

7. The energy storage device according to claim 1, wherein the uneven portion comprises a plurality of dips and bumps arranged side by side.

8. The energy storage device according to claim 1, wherein the uneven portion of the insulating layer is formed by a continuously uneven shape of the composite layer at the edge portion.

9. The energy storage device according to claim 1, wherein, upon light irradiating on the insulating layer in a direction which intersects a thickness direction of the insulating layer, the uneven portion of the insulating layer includes a shaded region in the insulating layer above the edge portion of the composite layer.

10. The energy storage device according to claim 9, wherein the shaded region includes at least one shade on the uneven portion of the insulating layer.

11. The energy storage device according to claim 9, wherein,
the shaded region includes at least one shade adjacent the at least one of the dip and the bump in the insulating layer.

12. The energy storage device according to claim 2, wherein the uneven portion comprises at least one of a dip and a bump arranged side by side.

13. The energy storage device according to claim 2, wherein the uneven shape comprises a plurality of irregularities in the composite layer at the edge portion.

14. The energy storage device according to claim 2, wherein the uneven portion comprises a plurality f dips and bumps arranged side by side.

15. The energy storage device according to claim 2, wherein the uneven shape comprises at least one of a dip and a bump arranged side by side.

16. The energy storage device according to claim 2, wherein, upon light irradiating on the insulating layer in a direction which intersects a thickness direction of the insulating layer, the uneven portion of the insulating layer includes a shaded region in the insulating layer above the edge portion of the composite layer.

17. The energy storage device according to claim 16, wherein the shaded region includes at least one shade on the uneven portion of the insulating layer.

18. The energy storage device according to claim 16, wherein
the uneven portion comprises at least one of a dip and a bump arranged side by side in the insulating layer, and
the shaded region includes at least one shade adjacent the at least one of the dip and the bump in the insulating layer.

19. An energy storage device comprising:
an electrode assembly which includes a positive electrode plate and a negative electrode plate,
wherein the positive electrode plate or the negative electrode plate includes:
a substrate which is electrically conductive;
a composite layer which is formed on the substrate, and
an insulating layer, at least a part of the insulating layer being continuously formed on the substrate and an edge portion which is a portion including an edge of the composite layer,
wherein an uneven portion is formed in the insulating layer above the edge portion of the composite layer,
wherein the uneven portion of the insulating layer is formed by an uneven shape of the composite layer at the edge portion, and
wherein the uneven shape comprises a plurality of irregularities in the composite layer at the edge portion.

* * * * *